United States Patent [19]

Tezuka et al.

[11] Patent Number: 4,795,089
[45] Date of Patent: Jan. 3, 1989

[54] ROOM AIR CONDITIONER

[75] Inventors: Tomofumi Tezuka; Kazuaki Isono, both of Shizuoka, Japan

[73] Assignee: Mitsubishi Denki Kabushiki Kaisha, Japan

[21] Appl. No.: 51,712

[22] Filed: May 20, 1987

[30] Foreign Application Priority Data

May 21, 1986 [JP] Japan .................................. 61-116938
Aug. 22, 1986 [JP] Japan .................................. 61-196677

[51] Int. Cl.⁴ ............................................... F24F 7/00
[52] U.S. Cl. ........................................ 236/49; 62/180; 236/94
[58] Field of Search ...................... 236/94, 1 R, 49 D, 236/78 R, 46 R; 62/180; 165/11 R, 26

[56] References Cited

U.S. PATENT DOCUMENTS 4,265,395 5/1981 Sumikawa et al. ............... 236/94 X
4,407,446 10/1983 Iijima ................................ 236/49 D
4,493,100 1/1985 Moriyama et al. ................ 236/1 R

FOREIGN PATENT DOCUMENTS 48-10666 3/1973 Japan .
56-45768 10/1981 Japan .

Primary Examiner—William E. Wayner
Attorney, Agent, or Firm—Leydig, Voit & Mayer

[57] ABSTRACT

A room air conditioner is equipped with an input switch mechanism for indicating room condition. The switch mechanism includes a first switch which a user presses when he feels hot and a second switch which the user presses when he feels cold. A microcomputer controls the operation of the air conditioner in response to signals from the input switch mechanism. When the user presses the first or second switch, the microcomputer automatically changes the set temperature and the temperature of air which is circulated in the room being air conditioned to correct the hot or cold room condition felt by the user to relieve the user's sense of discomfort. The circulated air temperature can be changed by changing the rotational speed of indoor blowers or the compressor, by changing the degree of opening of an electronic expansion valve disposed to provide heat exchange, or by changing the orientation of adjustable louvers such that the air circulates directly from an air outlet to an intake port of the air conditioner.

3 Claims, 13 Drawing Sheets

ROOM AIR CONDITIONER

BACKGROUND OF THE INVENTION

This invention relates to a room air conditioner which can provide a comfortable environment in accordance with the desire of the user, and particularly to an air conditioner which can quickly adjust the room temperature when the user feels hot or cold during the operation of the air conditioner so as to rapidly alleviate his sense of discomfort.

FIG. 1 illustrates in the form of a block diagram the control system of a conventional heat pump-type room air conditioner which is disclosed in Japanese Patent Laid-Open No. 56-137029. In the figure, numeral 1 is an operating switch which turns on a microcomputer 5. Numeral 2 denotes a semiconductor temperature-sensitive resistive element such as a thermistor for detecting temperature of a room being air conditioned and producing an analog output signal corresponding to the temperature. The output signal from the temperature-sensitive element 2 is converted into a digital signal by an A/D converter 3 and input to the microcomputer 5. A temperature setter 4 inuts a signal to the microcomputer 5 corresponding to a room temperature set by the user of the air conditioner. The microcomputer 5 is in the form of an LSI chip running on a prescribed program. It comprises a room temperature memory 7 which periodically reads the output from the A/D converter 3 and stores it as room temperature data Tr, a set temperature memory 8 which stores as set temperature data Ts a value which varies within a prescribed range from a predetermined central value based on an increase or decrease signal from the temperature setter 4, and a comparator 9 which compares the room temperature data Tr from the room temperature memory 7 and the set temperature data Ts from the set temperature memory 8 and sends a run or stop signal to a compressor 6.

The operation of the illustrated air conditioner during heating mode will now be explained. When the operating switch 1 is closed, the microcomputer 5 begins to operate in accordance with the above-mentioned program. The comparator 9 compares the room temperature data Tr with the set temperature data Ts. When Tr<Ts, the comparator 9 sends a run signal to the compressor 6, the air conditioner beings heating operation, and the room temperature rises towards the set temperature Ts. When the room temperature data Tr exceeds the set temperature data Ts, the comparator 9 sends a stop command to the compressor 6, and the air conditioner stops heating operation. Later, when the room temperature decreases and Tr<Ts, a run command is again sent to the compressor 6. This process is continuously repeated, the air conditioner performs intermittent heating operation, and the room temperature is maintained at substantially the set temperature Ts.

With the conventional room air conditioner of this type, the user controls the room temperature by adjusting the set temperature Ts in the temperature setter 4. However, the user can not directly input the sense of physical hot or cold environment into the temperature setter 4, but must mentally convert his desire for a warmer or cooler environment into a new set temperature and input it to the temperature setter 4. The operation of the air conditioner becomes complicated for it requires the user to have a good sense of the temperature scale. It is therefore difficult for a child, who does not have an understanding of temperature, to operate the air conditioner. Furthermore, if the temperature setter 4 requires the temperature to be input in accordance with the Fahrenheit temperature scale, it is difficult to properly set the temperature for a user who is accustomed to the Centrigrade scale.

As can be recognized in the conventional air conditioner, if the user changes the set temperature when the air conditioner is operated in a temperature transition mode and the room temperature has yet to reach the previously set temperature, the the operation of the air conditioner will be based on the newly set temperature. However, if the user alters the set temperature when he is unaware that the room temperature is still changing from an initially warmed or cooled level, the new temperature is likely to be too high for heating or too low for cooling. Therefore, he can easily end up setting the temperature at a level which he will find uncomfortable.

Furthermore, in the conventional air conditioner, when the user feels uncomfortable and changes the set temperature, the room temperature only gradually approaches the new set temperature, and it takes considerable time to relieve the user's feeling of discomfort.

SUMMARY OF THE INVENTION

It is therefore an object of the present invention to provide a room air conditioner which enables the user to control the room temperature by inputting to the air conditioner an input which directly indicates his sense of hot or cold.

It is another object of the present invention to provide a room air conditioner which can temporarily alter the temperature of the air discharged into a room when the user indicates that he is hot or cold so as to more quickly alleviate the user's discomfort.

It is still another object of the present invention to provide a room air conditioner which is extremely easy to operate, even for a child or other person who is unfamiliar with the temperature scale.

It is a further object of the present invention to provide a room air conditioner which can control the direction of discharged air when the temperature thereof has been temporarily changed.

A room air conditioner in accordance with the present invention is equipped with discomfort-indicating means by which the user can directly indicate his sense of hot or cold. When the user indicates that he feels hot or cold through the discomfort-indicating means, a controller automatically varies the temperature of the discharge air so as to quickly relieve the sense of hot or cold of the user. Thus, during heating operation, if the user indicates via the discomfort-indicating means that he feels cold, the temperature of the discharge air is temporarily raised, and during cooling operation, if the user indicates that he feels hot, the temperature of the discharge air is temporarily lowered.

The present invention further comprises means for automatically changing the set temperature on the basis of which the air conditioner operates when there is an input from the discomfort-indicating means, the set temperature being altered in the direction tending to relieve the user's sense of hot or cold.

In preferred embodiments of the present invention, the discomfort-indicating means comprises an input switch mechanism having a "hot" switch for indicating a "hot" environment and a "cold" switch for indicating a cold environment. The input switch mechanism inputs a different signal to the controller of the air conditioner depending upon which of the two switches is pressed.

In one preferred embodiment, the temperature-changing means comprises a controller which varies an rotational speed of a blower which draws air from the indoor heat exchanger of the air conditioner and discharges into the room being air conditioned.

In another preferred embodiment, the temperature-changing means comprises a controller which varies the rotational speed of the compressor of the air conditioner.

In yet another preferred embodiment, the temperature-changing means comprises a controller which varies the degree of opening of an electronic expansion valve for the refrigerant of the air conditioner.

In still another preferred embodiment, the temperature-changing means comprises a controller which controls the orientation of louvers which are mounted near the air outlet of the air conditioner and which control the blowing direction of the discharge air. The controller varies the temperature of the discharge air by orienting the louvers such that discharge air is drawn directly into the intake port of the air conditioner.

The air conditioner may have a single blower for discharging air into a room, or it may have an upper blower and a lower blower which are disposed above and below a heat exchanger, confronting an upper and a lower air outlet. When the temperature of the discharge air is to be changed, the rotational speeds of the upper and lower blowers are selectively controlled to vary the discharge air temperature, and at the same time to control the direction in which the air is blown, whereby it can blown directly at or away from the user.

BRIEF DESCRIPTION OF THE DRAWINGS

In the drawings, the same reference numerals indicate the same or corresponding parts.

DESCRIPTION OF THE PREFERRED EMBODIMENTS

Figure 1:
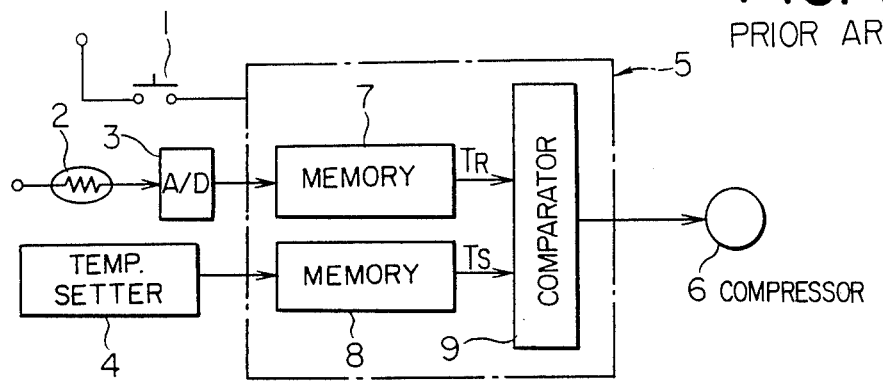
FIG. 1 is a block diagram of the control system of a conventional room air conditioner.

Hereinbelow, a number of preferred embodiments of a room air conditioner in accordance with the present invention will be described while referring to the accompanying drawings, beginning with FIG. 2, which is a block diagram illustrating the control system of a first embodiment. As shown in the figure, like the air conditioner of FIG. 1, this embodiment has a microcomputer 10 which is turned on by an operating switch 1. The microcomputer 10 comprises a CPU 11, an input circuit 12, a memory 13, and an output circuit 14, the latter three of which are connected to the CPU 11. A conventional temperature-sensitive resistive element 2 such as a thermistor which detects the temperature of the room being air conditioned and produces a corresponding output signal is connected to the input circuit 12 via an A/D converter 3, which converts the digital output signal of the temperature-sensitive element 2 into a digital input signal. The input circuit 12 is also connected to an input switch mechanism 15, comprising a hot switch 15a and a cold switch 15b. The input switch mechanism 15 constitutes discomfort-indicating means for directly indicating the user's sense of hot or cold to the microcomputer 10. The two switches of the input switch mechanism 15 are suitably labelled with words such as "hot" and "cold" to indicate that one switch (switch 15a in this case) is to be pressed when the user feels hot, while the other (switch 15b) is to be pressed when the user feels cold. The input switch mechanism 15 can input two different input signals to the input circuit 12, depending upon which of the two switches 15a and 15b is pressed. The output circuit 14 is connected to a compressor 6 which is controlled by the CPU 11 and an indoor fan motor 16 whose rotational speed is controlled by output signals from the output circuit 14.

Figure 2:
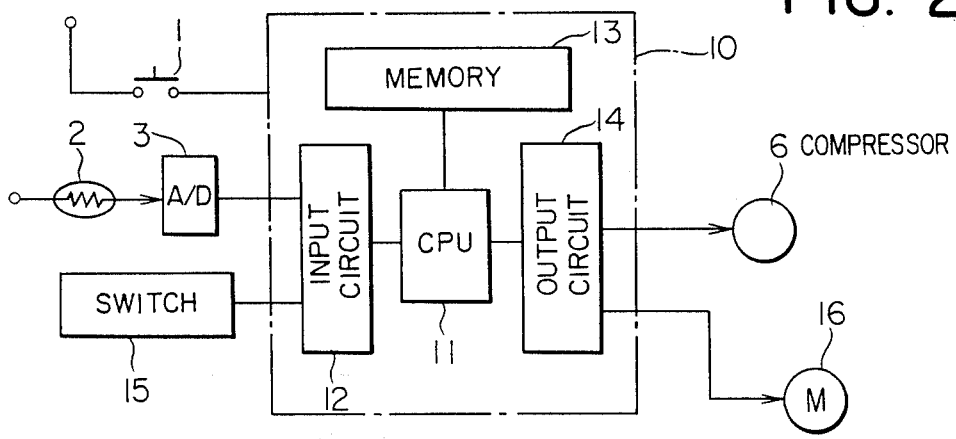
FIG. 2 is a block diagram of the control system of a first embodiment of a room air conditioner in accordance with the present invention.
Figure 4:
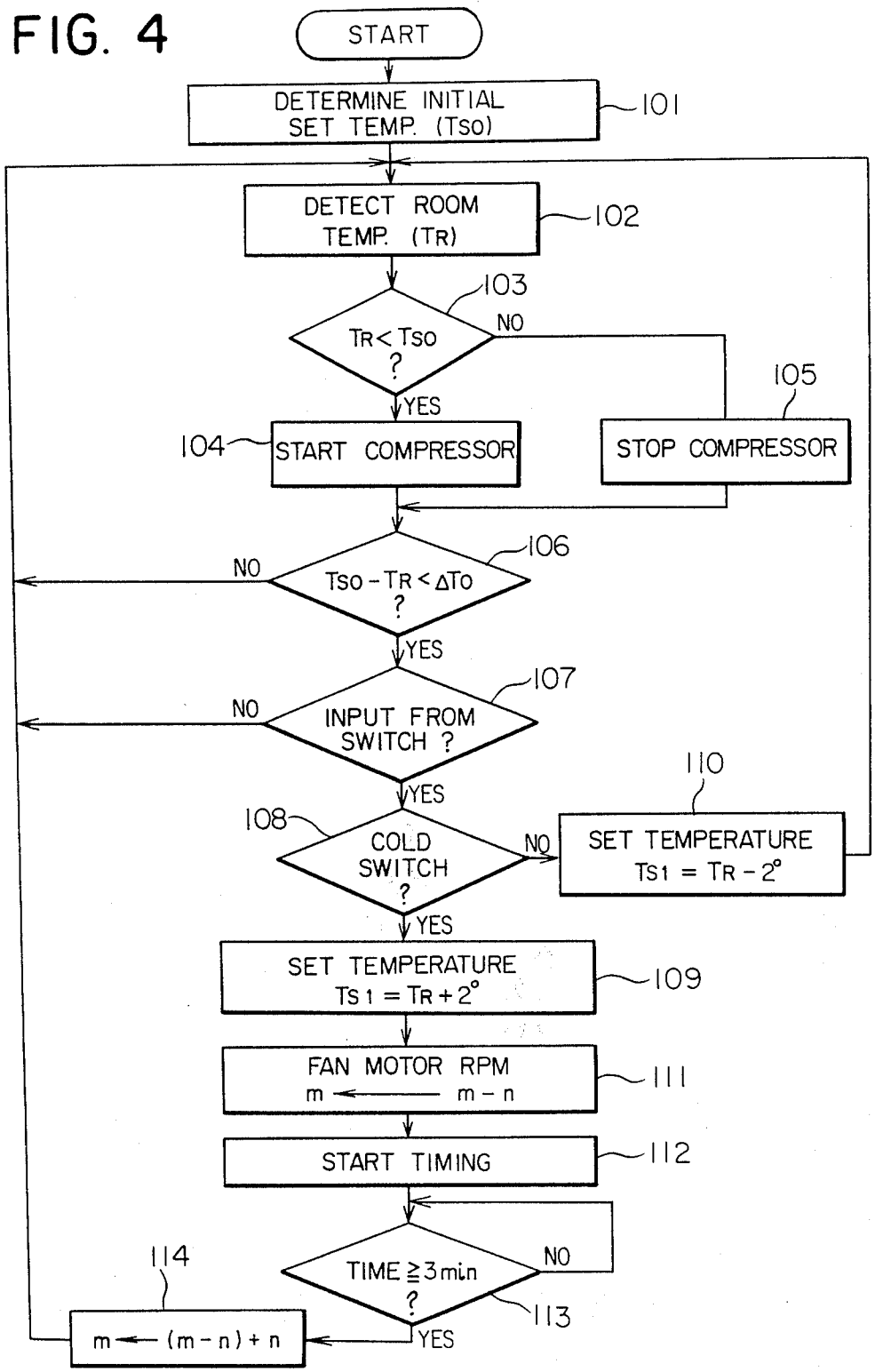
FIG. 4 is a flow chart illustrating the operation of the embodiment of FIG. 2.

FIG. 4 is a flow chart of a program which controls the operation of the embodiment of FIG. 2. It will be explained for the case in which the air conditioner is performing heating operation. The program beings to run when the operating switch 1 is closed. First, in Step 101 of the program, an initials set temperature Tso is set. In Step 102, the room temperature Tr which is detected by the temperature-sensitive element 2 is input to the microcomputer 10 via the A/D converter 3. In Step 103, the initial set temperature Tso and the room temperature Tr are compared. If Tr<Tso, then the program proceeds to Step 104 in which a run command is output from the output circuit 14 to the compressor 6. In Step 103, if it is determined that Tr≧Tso, the program proceeds to Step 105, and a halt command is output to the compressor 6.

Next, in Steps 106–110, the set temperature is determined. In Step 106, it is determined whether the difference between the initial set temperature Tso and room temperature Tr is smaller than a given value ΔTo. If the difference exceeds ΔTo, then the program returns to Step 102, while if the difference is less than ΔTo, the program proceeds to Step 107, and it is determined whether there was an input signal from the input switch mechanism 15. If it is determined in Step 107 that there was an input from one of the switches, then in Step 108, it is determined whether the input signal was from the hot switch 15a or the cold switch 15b.

In Step 108, if it is determined that the input signal was from the cold switch 15b, the program proceeds to Step 109 in which a new set temperature Ts1 is established. The new set temperature Ts1 is equal to the present room temperature Tr plus a prescribed amount, such as 2 degrees. On the other hand, if it is determined in Step 108 that the input signal was from the hot switch 15a, then in Step 110, a new set temperature Ts1 which is equal to the present room temperature Tr minus a prescribed amount, such as two degrees, is established. The program then returns to Step 102.

If the set temperature Ts1 was raised in Step 109, then in Steps 111–114, the indoor fan motor 16 is controlled so as to temporarily raise the temperature of the discharge air in order to quickly alleviate the user's sense of cold. First, in Step 111, the rotational speed m of the fan motor 16 is decreased by n rpm's, wherein n is a predetermined value. As a result, the blowing ability of an unillustrated indoor blower which is powered by the indoor fan motor 16 is reduced. In Step 112, the program begins timing, and in Step 113, it is checked whether a certain length of time, such as 3 minutes, has elapsed from the start of timing. If this length of time has yet to elapse, the program continues counting until the predetermined time has elapsed, upon which, in Step 114, the rotational speed of the fan motor 16 is increased by n rpm's to its initial value, and the blowing ability of the indoor blower is returned to its previous level. As a result, the temperature of the discharge air also returns to its previous level.

In this manner, during heating operation, when the user feels cold and presses the cold switch 15b, the set temperature is automatically raised by 2 degrees from the present room temperature and the blowing ability of the indoor blower is decreased. As a result of the decreased blowing ability, the pressure and temperature of the unillustrated indoor heat exchanger of the air conditioner rises, and the temperature of the discharge air is raised so that the user's sense of cold is immediately relieved.

Subsequent to the operation of the input switch mechanism 15, the compressor 6 is turned on and off based on the new set temperature Ts1 in the manner shown in Steps 102–105, and the room temperature is controlled so as to match the new set temperature Ts1.

Each time the set temperature is changed, the new set temperature is stored in the memory 13 of the microcomputer 10. If the air conditioner is turned off and then later turned on again, the value of the set temperature T21 at the time that the air conditioner was turned off is used as the initial set temperature Tso.

Figure 5:
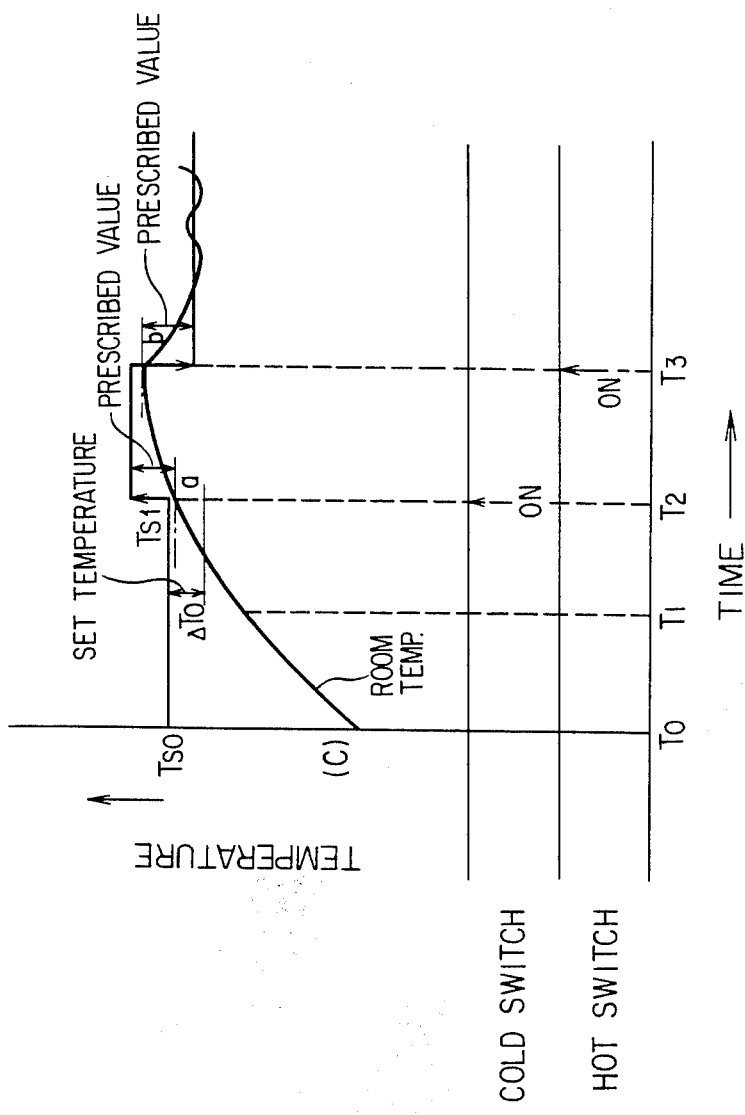
FIG. 5 is a graph illustrating the change in the temperature of a room being air conditioned by the present invention at the start of operation.

FIG. 5 illustrates the change in the room temperature during heating operation when the air conditioner of FIG. 2 is first turned on. The air conditioner is turned on at time T0, and the room temperature begins to rise towards the initial set temperature Tso. If the user presses the cold switch 15b at time T1, the set temperature is not changed since the room temperature differs from the initial set temperature Tso by more than $\Delta$To. However, if the user presses the cold switch 15b at time T2, since the difference between the room temperature Tr and the initial set temperature Tso is now less than $\Delta$To, the set temperature is increased by a prescribed amount to a new value Ts1, and the compressor 6 continues to operate so as to raise the room temperature even further to the new set temperature. Furthermore, if the user presses the hot switch 15a at time T3, the set temperature Ts1 will be lowered below the present room temperature by a prescribed amount, and the compressor 6 will be stopped until the room temperature drops below the new set temperature.

Thus, in accordance with the present invention, when the user indicates that he feels hot or cold, not only is the set temperature changed in the direction tending to relieve his sense of discomfort, but the temperature of the discharge air is temporarily changed so as to more quickly bring the room temperature to a comfortable level.

Furthermore, since the recently set temperature is stored iin the memory when the air conditioner is turned off and is used as the initial set temperature when the air conditioner is again used, the room temperature is automatically brought to a level which the previous user found comfortable without the user having to make any adjustments.

In addition, if the user presses the hot or cold switch when the room temperature is in transition and has yet to near the initial set room temperature, the input from the input switch mechanism 15 is ignored. Therefore, there is less possibility of the user setting the temperature at an uncomfortable level at the start of operation when he is unaware that the room temperature is still changing.

Figure 6:
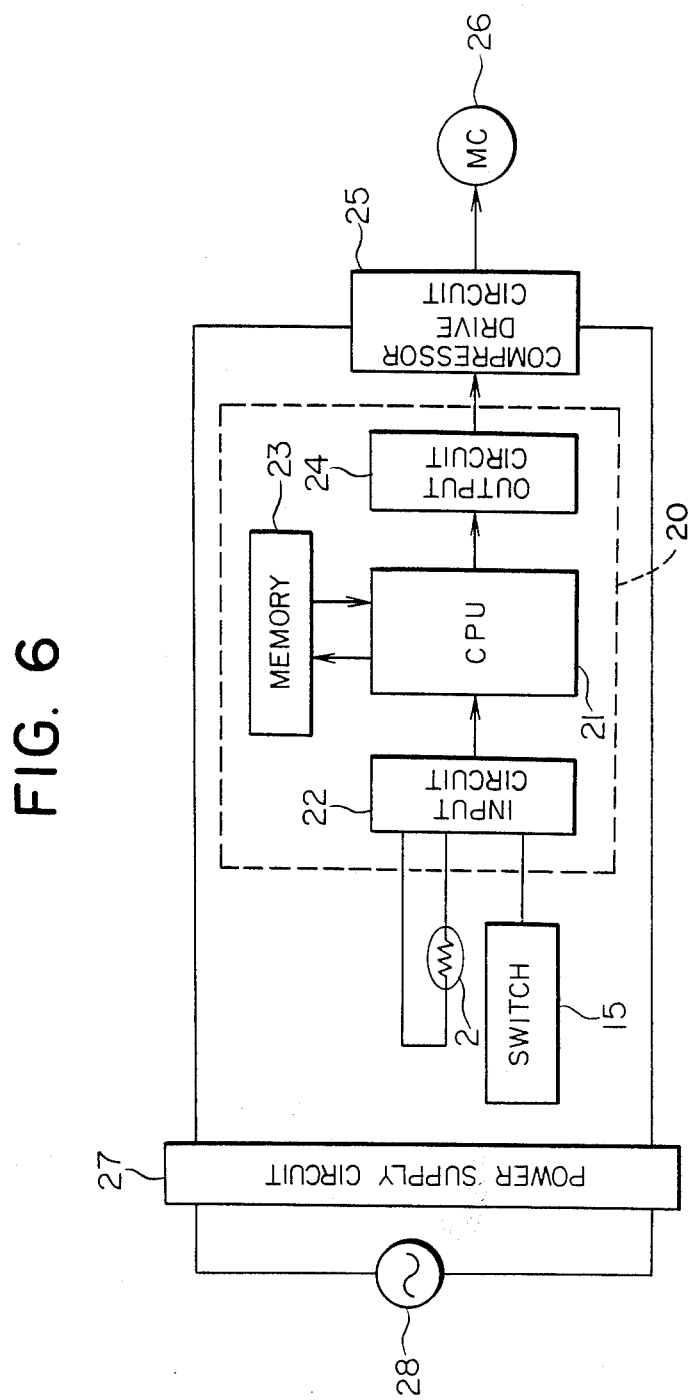
FIG. 6 is a block diagram of the control system of a second embodiment of the present invention.
Figure 7:
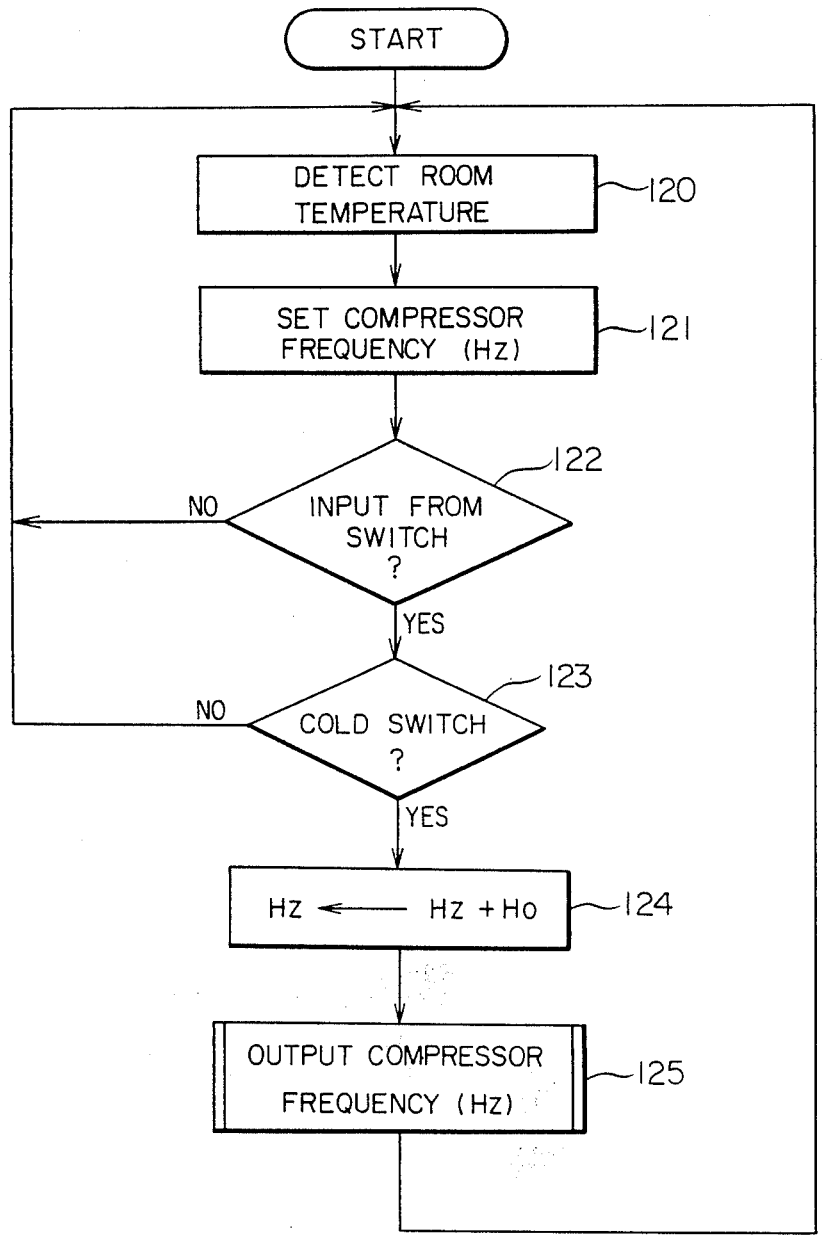
FIG. 7 is a flow chart illustrating the operation of the embodiment of FIG. 6.

In the embodiment of FIG. 2, the temperature of the discharge air is temporarily changed by varying the rotational speed of an indoor fan motor for a prescribed length of time. However, the same result can be achieved by changing various other operational parameters. FIGS. 6 and 7 illustrate a second embodiment of the present invention in which the temperature of discharge air is varied by controlling the rotational speed of the motor of the compressor 6.

Figure 3:
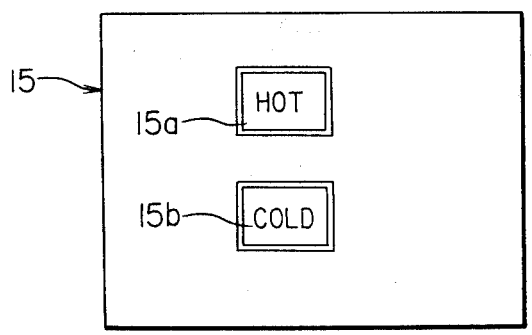
FIG. 3 is a front view of the input switches of the embodiment of FIG. 2.

FIG. 6 is a block diagram of the control system of this second embodiment. The control system has a microcomputer 20 comprising a CPU 21, an input circuit 22, a memory 23, and an output circuit 24, the latter three of which are connected to the CPU 21 in the same manner as in the previous embodiment. A conventional temperature-sensitive resistive element 2 which detects the room temperature is connected to the input circuit 22 and provides an input signal corresponding to the room temperature. An input switch mechanism 15 like that shown in FIG. 3 is also connected to the input circuit 22 and produces an input signal to the input circuit 22 when the user presses the hot switch 15a or the cold switch 15b. The compressor motor 26 of the compressor of the air conditioner is driven by a compressor drive circuit 25 which supplies AC current to the compressor motor 26. The frequency of the current which is supplied to the compressor motor 26 by the drive circuit 25 and the turning on and off of the drive circuit 25 is controlled by commands from the CPU 21 based on the input signals from the temperature-sensitive element 2 and the input switch mechanism 15. The commands from the CPU 21 are input to the drive circuit 25 through the output circuit 24. The compressor drive circuit 25 is powered by a commercial AC power supply 28 and a power supply circuit 27 which converts the AC power from the power supply 28 into DC power and supplies it to the compressor drive circuit 25. The DC power is then converted into AC power by the drive circuit 25.

The program executed by the microcomputer 20 during heating operation by the embodiment of FIG. 6 is illustrated in the flow chart of FIG. 7. First, in Step 120, the room temperature which is detected by the temperature-sensitive resistive element 2 is input to the CPU 21 through the input circuit 22. Next, in Step 121, the frequency Hz of the current which is supplied to the compressor motor 26 is determined. Then, in Step 122, it is determined whether there was an input signal from the input switch mechanism 15. If there was no input signal, then the program returns to Step 120. If it is determined that there was an input signal, then in Step 123, it is determined whether the input was from the hot switch 15a or the cold switch 15b. If it is determined that the input was from the hot switch 15a, the program returns to Step 120, but if it is determined that the input signal was from the cold switch 15b, then in Step 124, the frequency of the current supplied to the compressor motor 26 is increased by a prescribed value Ho. Then, in Step 125, the CPU 21 controls the compressor drive circuit 25 so as to supply AC current to the compressor motor 26 at the new frequency Hz. After the compressor motor 26 has been run at the new frequency for a prescribed length of time, such as 3 minutes, the frequency is again lowered to its original level, and the program then returns to Step 120. As a result, the rotational speed of the compressor motor 26 is quickly raised for the prescribed length of time, causing the pressure and temperature of the heat exchanger of the air conditioner to rise. The discharge air temperature therefore rises so as to quickly relieve the user's sense of cold.

It can be seen that in this embodiment, by controlling the frequency of the current supplied to the compressor motor, the same results are obtained as in the first embodiment in which the speed of the fan motor is controlled.

Although not shown in the flow chart of FIG. 7, in this embodiment as in the previous embodiment, when the user presses the hot or cold switch, the set temperature is changed in the direction tending to alleviate the user's sense of hot or cold in a sequence of steps corresponding to Steps 108–110 of FIG. 4. Furthermore, between Steps 120 and 121, the CPU 11 controls the operation of the compressor 6 based on the room temperature and the set temperature in a manner analogous to that shown in Steps 103–105 of FIG. 2.

Figure 8:
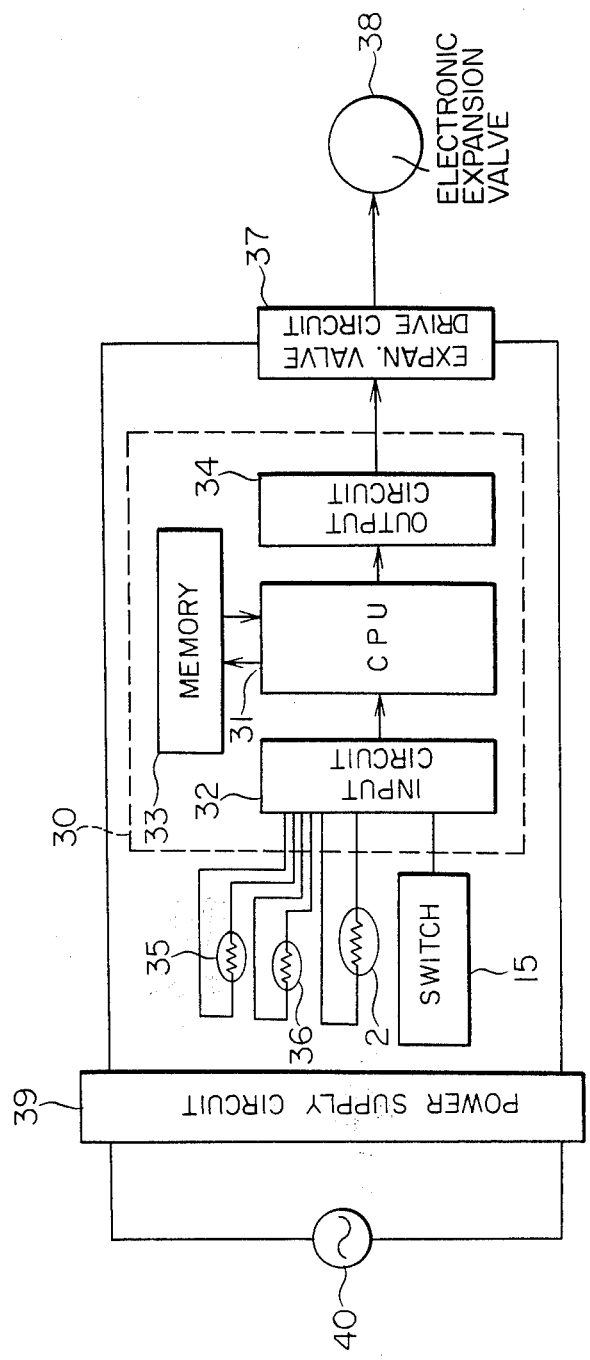
FIG. 8 is a block diagram of the control system of a third embodiment of the present invention.

FIG. 8 is a block diagram of the control system of a third embodiment of an air conditioner in accordance with the present invention in which the temperature of the discharge air is temporarily varied by changing the degree of opening of an electronic expansion valve in a refrigerant loop. As shown in the figure, this embodiment is controlled by a microcomputer 30 comprising a CPU 31, an input circuit 32, a memory 33, and an output circuit 34 which are connected to one another in the same manner as the corresponding parts in the previous embodiment. The input circuit 32 is connected to a temperature-sensitive resistive element 2 which detects the room temperature and produces a corresponding output signal, and an input switch mechanism 15 which is identical to that of the previous embodiments. The input circuit 32 also receives input signals from two other temperature detectors 35 and 36. Temperature detector 35 produces an output signal corresponding to the temperature of the unillustrated outdoor heat exchanger of the air conditioner which functions as an evaporator during heating operation. The other temperature detector 36 produces an output signal corresponding to the temperature of the refrigerant at the intake port of the compressor. The pressure of the refrigerant which passes through an unillustrated refrigerant loop which connects the outdoor heat exchanger, the indoor heat exchanger, and the compressor is reduced by an electronic expansion valve 38. The degree of opening of the electronic expansion valve 38 is controlled by an expansion valve drive circuit 37, which is in turn controlled by the CPU 31 through the output circuit 34. Current is supplied to the expansion valve drive circuit 37 by a power supply circuit 39 which is connected to a commercial AC power supply 40.

Figure 9:
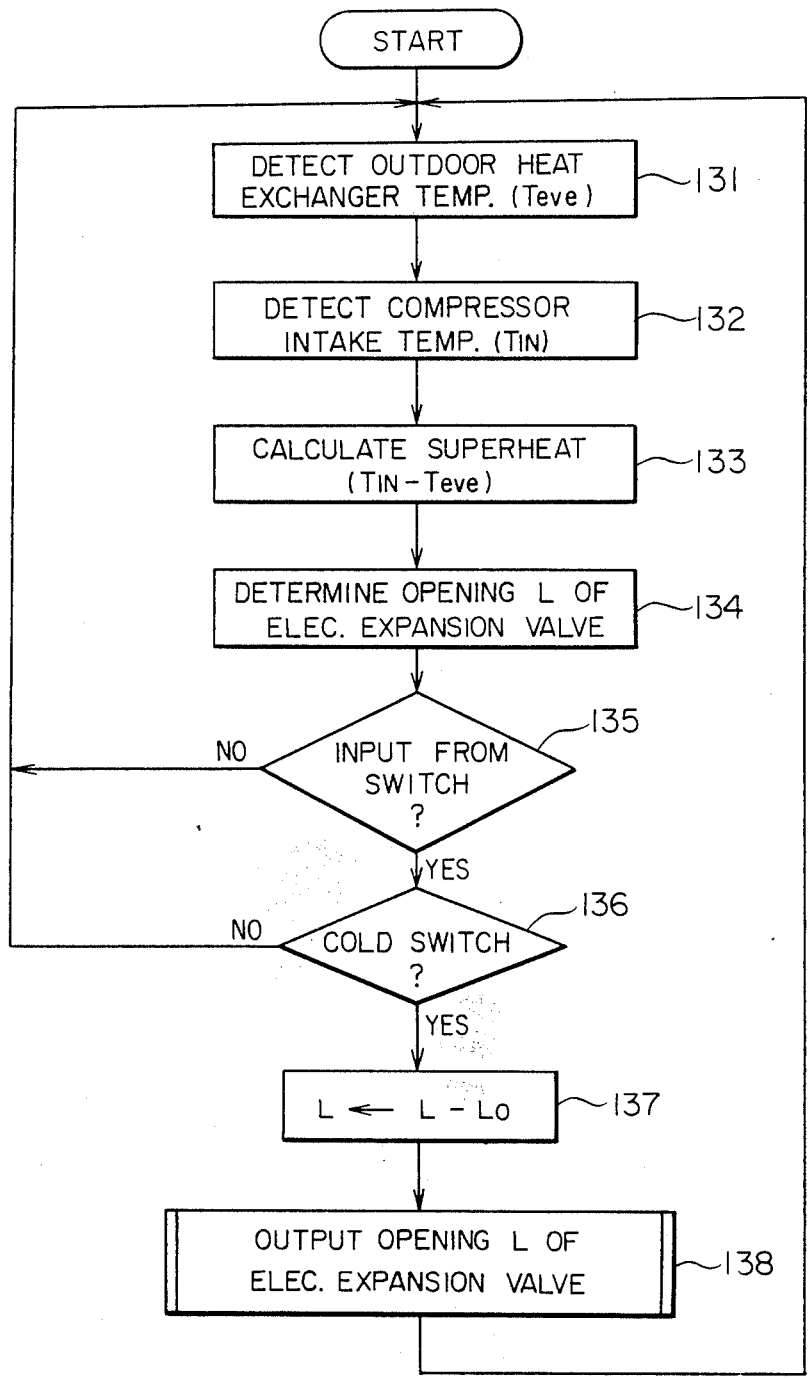
FIG. 9 is a flow chart illustrating the operation of the embodiment of FIG. 8.

The program which is executed by the microcomputer 30 during heating operation of the embodiment of FIG. 8 is illustrated by the flow chart of FIG. 9. First, in Step 131, the temperature Teve of the outdoor heat exchanger is detected by temperature detector 35 and a corresponding input signal is input to the CPU 31 through the input circuit 32. Next, in Step 132, the temperature Tin of the refrigerant entering the compressor is detected by temperature detector 36, and a corresponding input signal is input to the CPU 31. Next, in Step 133, the CPU 31 calculates the degree of superheat of the refrigerant entering the compressor, which is equal to Tin−Teve. In Step 134, the degree of opening L of the electronic expansion valve 38 is determined based on the degree of superheat. The degree of opening L is controlled such that the degree of superheat will be constant, whereby the flow through the refrigerant loop is stabilized. The greater the flow rate through the expansion valve 38 the greater is L). Next, in Step 135, it is determined whether there was an input signal from the input switch mechanism 15. If there was no input signal, then the program returns to Step 131, but if there was an input signal, then in Step 136, it is determined whether the input signal was from the hot switch 15a or the cold switch 15b. If the input signal was from the hot switch 15a, then the program returns to Step 131, but if it is determined that the input signal was from the cold switch 15b, then in Step 137, the degree of opening L of the expansion valve 38 is decreased by a prescribed amount Lo. Next, in Step 138, the new degree of opening is output from the CPU 31 to the expansion valve drive circuit 37 via the output circuit 34, and the drive circuit 37 changes the degree of opening of the expansion valve 38 to the new valve of L for a prescribed length of time, such as three minutes. As a result, the pressure and temperature of the indoor heat exchanger quickly rises, and the temperature of the discharge air increases so as to quickly alleviate the user's sense of cold. After the prescribed length of time, the degree of opening L is returned to its previous level, and the program returns to Step 131. Although not shown in the flow chart, each time the input switch mechanism 15 is operated, the set temperature is changed in the same manner as in the previous embodiments. Furthermore, the CPU 31 turns the compressor of the air conditioner on and off in accordance with the room temperature and the set temperature in the same manner as in the previous embodiments.

Figure 10:
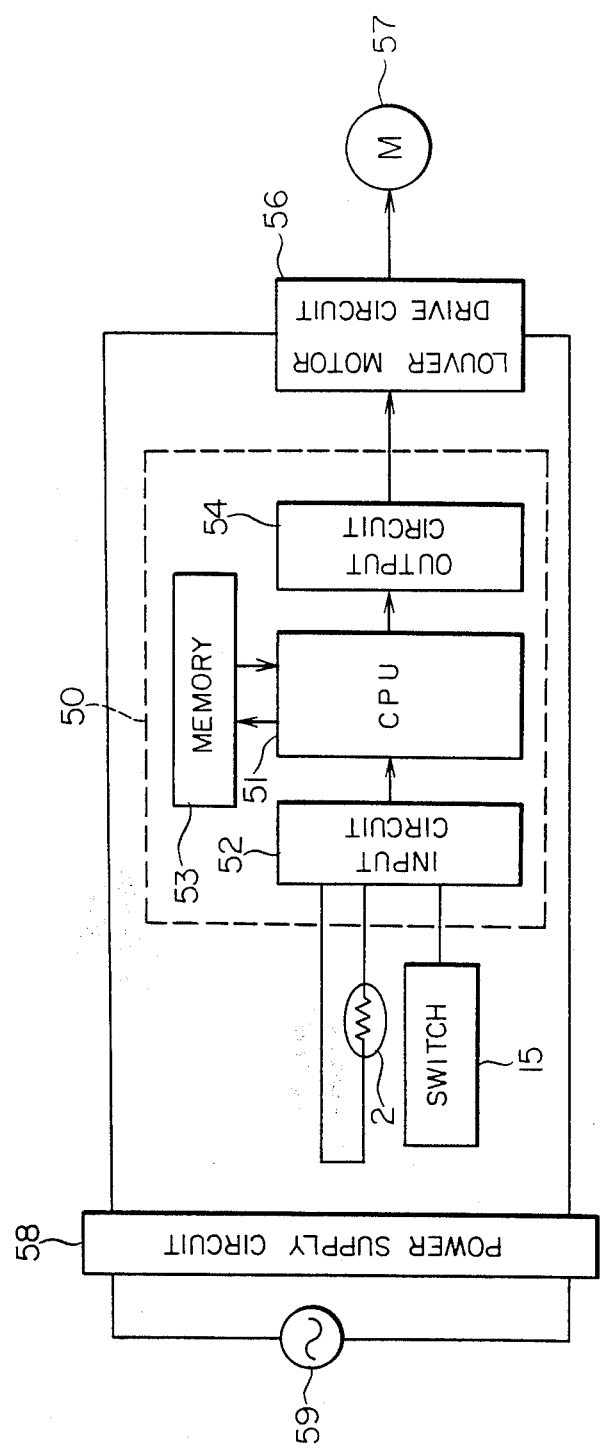
FIG. 10 is a block diagram of the control system of a fourth embodiment of the present invention.

FIG. 10 is a block diagram of the control system of a fourth embodiment of the present invention in which the temperature of discharge air is temporarily changed by adjusting the orientation of louvers of the air conditioner which control the blowing direction of air which is discharged from the air outlet of the air conditioner into the room being air conditioned. As in the previous embodiments, the air conditioner is controlled by a microcomputer 50 comprising a CPU 51, an input circuit 52, a memory 53, and an output circuit 54. The input circuit receives input signals from a temperature-sensitive resistive element 2 which detects the room temperature and an input switch mechanism 15 which produces an input signal when the user presses a hot switch 15a or a cold switch 15b like that shown in FIG. 3. The output circuit 54 is connected to a louver motor drive circuit 56 which drives a louver motor 57. The louver motor 57 adjusts the orientation of unillustrated louvers which are installed on the air outlet of the air conditioner and which direct the flow of the discharge air. Power for the louver motor drive circuit 56 is supplied from a power supply circuit 58 which is connected to a commercial AC power supply 59.

During the heating operation of the embodiment of FIG. 10, if the user presses the cold switch 15b, the CPU 51 sends a command to the louver motor drive circuit 56 via the output circuit 54, and the louver motor 57 is driven by the drive circuit 56 so as to change the orientation of the louvers so that air which is discharged into the room through the louvers enters directly into the intake port of the air conditioner and is reheated. As a result, the temperature of the heat exchanger rapidly rises, the discharge air temperature accordingly rises, and the user's sense of cold can be immediately relieved. After a prescribed length of time, such as three minutes, the CPU 51 sends a command to the drive circuit 56, and the louver drive motor 57 returns the louvers to their initial orientation. As in the previous embodiments, when the user operates the input switch mechanism 15, the CPU 51 changes the set temperature in the direction tending to alleviate the user's discomfort. Furthermore, the CPU 51 controls the compressor of the air conditioner based on the room temperature and the set temperature in the same manner as in the previous embodiments.

Figure 11A:
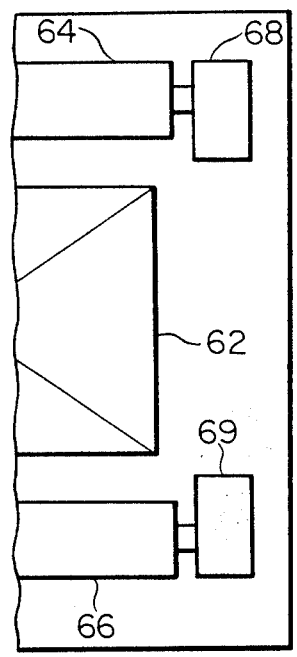
FIG. 11a is a front view of a portion of the inside of an indoor unit of a fifth embodiment of an air conditioner in accordance with the present invention.
Figure 11B:
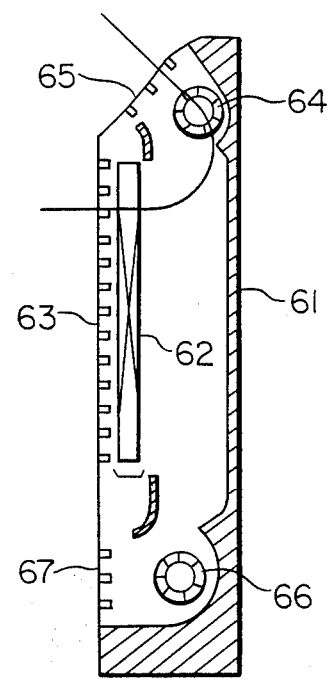
FIG. 11b is a vertical transverse cross-sectional view thereof.
Figure 12:
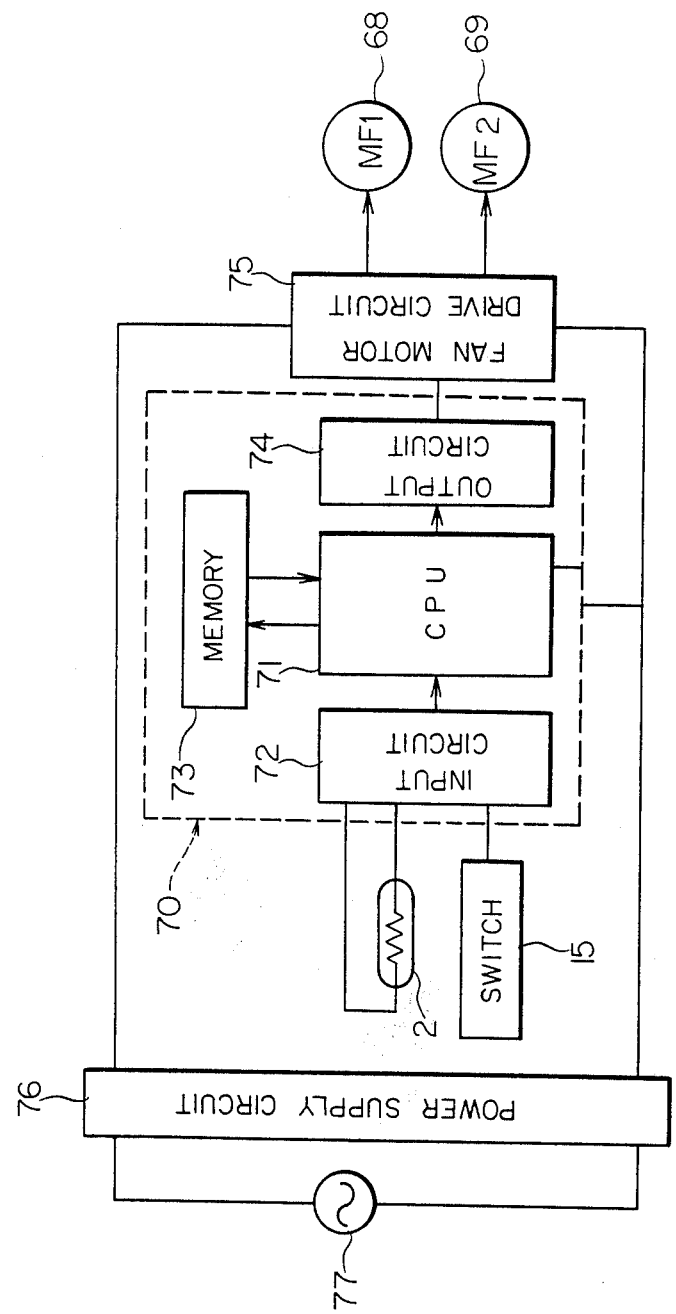
FIG. 12 is a block diagram of the control system of the embodiment of FIG. 11.

FIGS. 11 and 12 illustrate a fifth embodiment of an air conditioner in accordance with the present invention. This embodiment is in the form of a separate-type air conditioner (one having a separate indoor and outdoor unit) with a floor-mounted indoor unit. FIG. 11a is a front view of a portion of the inside of the indoor unit 61, and FIG. 11b is a vertical, transverse cross-sectional view thereof. The indoor unit 61 has an indoor heat exchanger 62 which is mounted in roughly the center thereof and confronts an intake port 63 which is formed in the front surface of the indoor unit 61. An upper blower 64 and a lower blower 66 are installed inside the unit 61 above and below, respectively, the heat exchanger 62. An upper air outlet 65 is formed in the upper portion of the front surface of the indoor unit 61 in a position confronting the upper blower 64, and a lower air outlet 67 is formed in the lower portion of the front surface of the indoor unit 61 in a position confronting the lower blower 66. The upper blower 64 and the lower blower 66 are driven by an upper fan motor 68 and a lower fan motor 69, respectively.

FIG. 12 is a block diagram of the control system of this embodiment. The air conditioner is controlled by a microcomputer 70 comprising a CPU 71, an input circuit 72, a memory 73, and an output circuit 74 which are connected with one another in the same manner as in the previous embodiments. The input circuit 72 receives input signals from a temperature-sensitive resistive element 2 which detects the room temperature and an input switch mechanism 15 like that shown in FIG. 3 which produces an input signal when the user presses a hot switch 15a or a cold switch 15b. The output circuit 74 is connected to a fan motor drive circuit 75 which supplies AC power to the upper fan motor 68 and the lower fan motor 69 and drives them at rotational speeds which are controlled by the CPU 71. Power for the fan motor drive circuit 75 is supplied by a power supply circuit 76 which is connected to a commercial AC power supply 77. The power supply circuit 76 converts the AC power from the power supply 77 and supplies DC power to the fan motor drive circuit 75, which then converts the DC power back into AC power.

Figure 13:
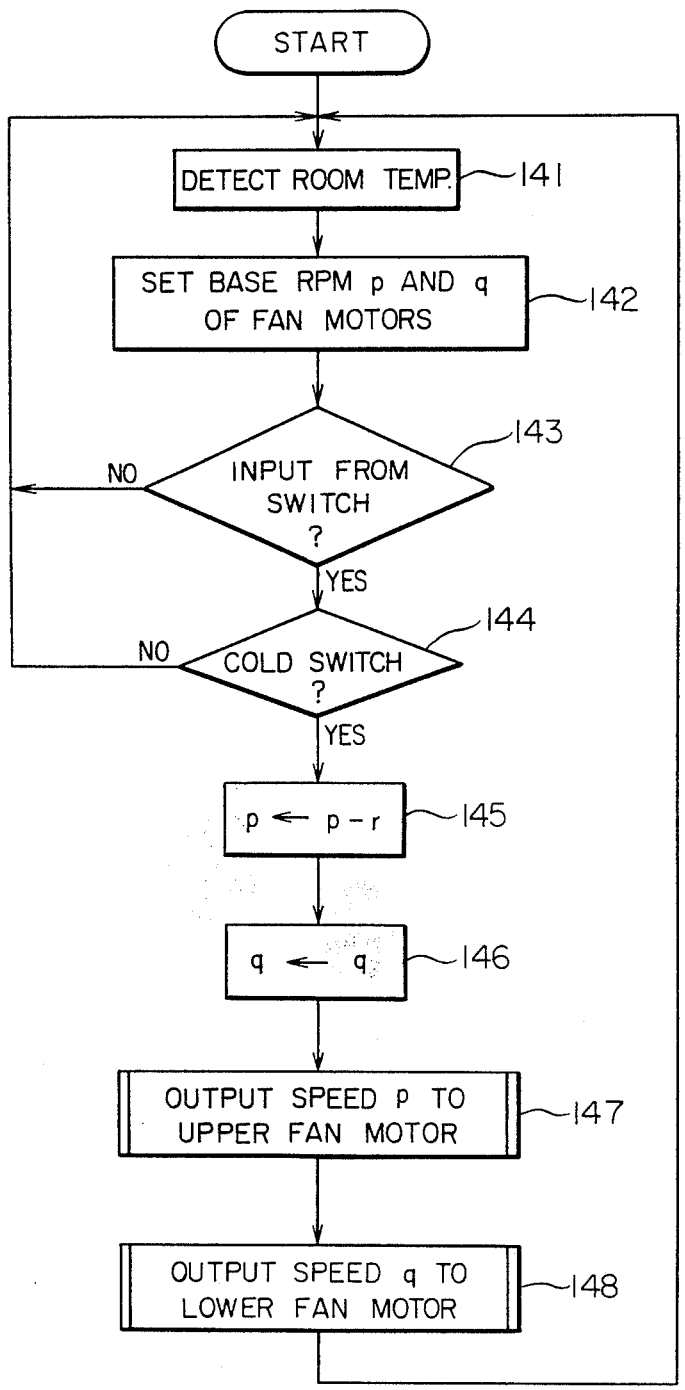
FIG. 13 is a flow chart of one mode of operation of the embodiment of FIG. 12.

Three different modes of operation of the embodiment of FIG. 12 will now be described while referring to FIGS. 13 through 15, respectively, which illustrate programs executed by te CPU 71 of FIG. 12 during heating operation. The first mode of operation is illustrated in FIG. 13. First, in Step 141, the room temperature is detected by the temperature-sensitive element 2 and a corresponding input signal is input to the CPU 71 via the input circuit 72. Next, the CPU 71 determines the base rotational speeds p and q of the upper fan motor 68 and the lower fan motor 69, respectively. In Step 143, it is determined whether there was an input signal from the input switch mechanism 15. If there was no input, then the program returns to Step 141, but if there was an input signal, in Step 144, it is determined whether the input signal was from the hot switch 15a or the cold switch 15b. If the input was from the hot switch 15a, the program returns to Step 141. However, if the input signal was from the cold switch 15b, then in Step 145, the rotational speed p of the upper fan motor 68 is reduced by a prescribed value r, while in Step 146, the rotational speed q of the lower fan motor 69 is maintained constant. In Steps 147 and 148, the CPU 71 sends a command to the fan motor drive circuit 75 to operate the upper and lower fan motors 68 and 69 at the rotational speeds p and q which were calculated in Steps 145 and 146. After the fan motors are run at these new speeds for a prescribed length of time, such as three minutes, the rotational speeds are returned to their earlier levels, and the program then returns to Step 141.

Thus, in this mode of operation, when the user presses the cold switch 15b during heating operation, due to the decrease in the rotational speed of the upper fan motor 68, the rate at which the upper blower 66 discharges air is temporarily decreased, while the rate at which the lower blower 67 discharges air is maintained constant. As a result, the pressure and the temperature within the indoor heat exchanger 62 increase, and the temperature of the air which is discharged from the air outlets 67 and 68 rapidly rises, thereby alleviating the user's sense of cold. As in the previous embodiments, when the user operates the input switch mechanism 15, the set temperature is changed in the direction tending to relieve the user's discomfort. The turning on and off of the compressor is also controlled by the CPU 71 based on the room temperature and the set temperature in the same manner as in the previous embodiments.

Figure 14:
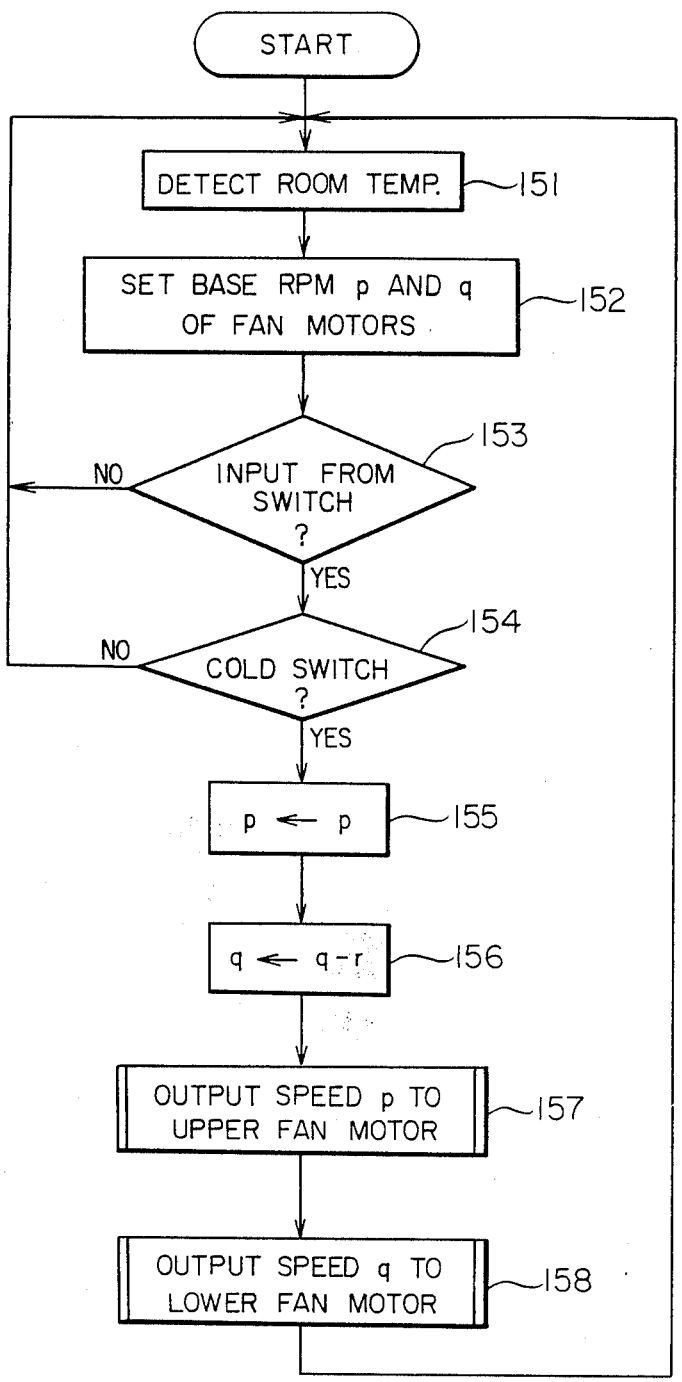
FIG. 14 is a flow chart illustrating another mode of operation of the embodiment of FIG. 12.

FIG. 14 is a flow chart illustrating the program executed by the CPU 17 during heating operation in accordance with a second mode of operation of the embodiment of FIG. 12. This mode of operation is nearly identical to that illustrated in FIG. 13, and Steps 151-154 are identical to Steps 141-143. However, in Step 154, if is determined that there was an input signal from the cold switch 15b, then in Steps 155 and 156, the rotational speed p of the upper fan motor 68 is maintained constant while the rotational speed g of the lower fan motor 69 is decreased by a prescribed amount r, and in Steps 157 and 158, the fan motors 68 and 69 are controlled so as to operate at the rotational speeds p and q determined in Steps 155 and 156, respectively. After a prescribed length of time, the fan motors are returned to their previous rotational speeds, and the program returns to Step 151. As a result, if the user feels cold during heating operation and presses the cold switch 15b, the blowing rate of the upper blower 66 remains constant while the blowing rate of the lower blower 66 is temporarily decreased. The pressure and temperature of the indoor heat exchanger 62 accordingly rise, and the temperature of the air which is discharged fromt he air outlets 65 and 67 is rapidly increased to quickly alleviate the user's sense of cold.

Figure 15:
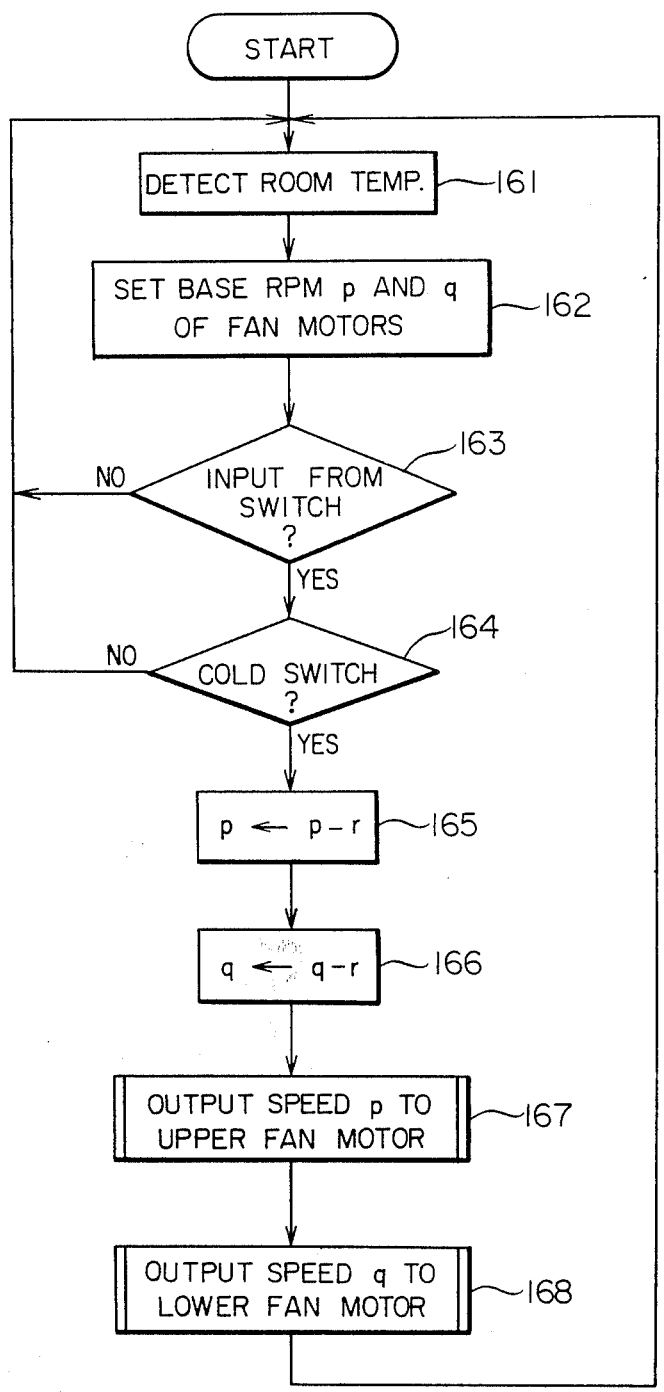
FIG. 15 is a flow chart illustrating yet another mode of operation of the embodiment of FIG. 12.

FIG. 15 is a flow chart illustrating a third mode of operation of the embodiment of FIG. 12. Steps 161–164 are identical to Steps 141–144 of the flow chart of FIG. 13. However, if it is determined in Step 164 that there was an input signal from the cold switch 15b, then in Steps 165 and 166, the CPU 71 reduces the rotational speeds p and q of both the upper fan motor 68 and the lower fan motor 69 by a prescribed value r, and in Steps 167 and 168, the upper fan motor 68 and the lower fan motor 69 are made to run at the new rotational speeds determined in Steps 165 and 166, respectively. After a prescribed length of time, the fan motors are returned to their previous rotational speeds, and the program returns to Step 161.

Thus, if the user feels cold during heating operation and presses the cold switch 15b, the blowing rates of both the upper blower 64 and the lower blower 66 are decreased, the pressure and temperature within the indoor heat exchanger 62 accordingly rises, the temperature of the discharge air rapidly increases, and the user's sense of cold can be quickly relieved.

Although this fifth embodiment was explained with respect to an air conditioner having a floor-mounted indoor unit 61, the present invention is equally applicable to an air conditioner with a wall-mounted or ceiling-mounted indoor unit.

In the fifth embodiment, when the temperature of the discharge air is temporarily changed, the blowing rate of the discharge air is simultaneously descreased. If the discharge air directly impinges on the user, he is particularly sensitive to the change in blowing rate and to the change in temperature, and depending on the conditions within the room, he may find the change in blowing rate to be either pleasant or unpleasant. Therefore, in situations in which the user finds a change in blowing rate pleasant, it is desirable that the discharge air to directly impinge upon the user, and in situations in which the user finds a change in blowing rate unpleasant, it is desirable that the discharge air not directly impinge on him. By controlling the blowing rates of the upper and lower blowers in accordance with the three different modes of operation illustrated in FIG. 13-15, it is possible to control the direction of the discharge air so as to control whether or not it directly strikes the user. Which of the three modes of operation is used depends on the manner of installation of the indoor unit and its position relative to the user. Thus, this fifth embodiment has the special advantage that not only can the room temperature be rapidly changed to a level desired by the user, but that the change in temperature is effected in a manner which is most pleasing to the user by controlling the blowing direction of discharge air.

In the above-described embodiments, an input switch mechanism 15 comprising a hot switch 15a and a cold switch 15b is used to enable the user to indicate when he feels hot or cold. However, there is no restriction on the exact structure of an input mechanism, and means other than switches can be used, such as a dial which is turned in one direction to indicate that the user is cold and in another direction to indicate that the user is hot.

In each of the above-described embodiments, an explanation was given with respect to heating operation, but the present invention can of course be used for cooling as well. During cooling operation, if the user presses the hot switch 15b, the temperature of the discharge air is lowered for a prescribed length of time by the same steps as in the previous embodiments so as to quickly relieve the user's sense of discomfort.

What is claimed is:

1. A room air conditioner comprising:
air-circulating means including a blower operatively connected to rotate at a speed for circulating air into and out of a room being air-conditioned;
room temperature sensing means for sensing temperature of the room;
control means operatively responsive to the room temperature sensed by said room temperature sensing means for determining a set temperature to activate said circulating means on and off based on a difference between the room temperature sensed by said room temperature sensing means and the set temperature determined by said control means;
user-operated discomfort-indicating means for producing an output signal indicative of a hot or cold room condition felt by a user;
temperature-changing means including means for temporarily changing the rotational speed of said blower so as to temporarily change temperature of the circulated air from said air-circulating means to correct the hot or cold room condition so as to alleviate the user's sense of discomfort on the basis of the output signal from said discomfort-indicating means.

2. A room air conditioner as claimed in claim 1 further comprising a first air outlet and a second air outlet disposed on opposite sides of an indoor heat exchanger, said air-circulating means comprising a first blower and a second blower disposed in positions confronting said first air outlet and said second air outlet and operatively connected to rotate at corresponding speeds, and said temperature-changing means comprising means for temporarily changing the rotational speed of at least one of said blowers.

3. A room air conditioner as claimed in claim 1 wherein said discomfort-indicating means comprises first and second switches operatively connected to said control means and generating corresponding output signals indicative of hot and cold room conditions.

* * * * *